United States Patent
Matsushima

(10) Patent No.: US 9,164,012 B2
(45) Date of Patent: Oct. 20, 2015

(54) INTERNAL COMBUSTION ENGINE KNOCK CONTROLLING APPARATUS

(75) Inventor: Yuhei Matsushima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 544 days.

(21) Appl. No.: 13/552,391

(22) Filed: Jul. 18, 2012

(65) Prior Publication Data
US 2013/0245924 A1      Sep. 19, 2013

(30) Foreign Application Priority Data
Mar. 14, 2012      (JP) ................ 2012-056629

(51) Int. Cl.
*F02P 5/152*      (2006.01)
*G01M 15/12*      (2006.01)
(Continued)

(52) U.S. Cl.
CPC .......... *G01M 15/12* (2013.01); *F02D 35/027* (2013.01); *G01L 23/221* (2013.01); *F02D 2041/1432* (2013.01); *F02D 2041/286* (2013.01)

(58) Field of Classification Search
CPC .......... F02D 35/027; F02D 2041/1432; F02D 2041/286; F02D 41/008; F02D 2041/1412; F02D 2200/025; G01M 15/12; Y02T 10/40; G01L 23/221; G01L 23/22; F02P 5/152; F02P 5/1522; F02P 2017/128; G01N 29/11; G01N 29/12; G01N 29/449; G05B 23/0235
USPC ............ 701/111, 30.2, 30.3, 30.4, 30.8, 30.9, 701/31.1, 31.2, 32.9, 33.1, 33.4, 33.6, 33.7, 701/33.8, 33.9, 34.1; 73/35.01, 35.03, 73/35.04, 35.05, 35.06, 35.09, 35.11, 73/35.12, 35.13, 114.02, 114.03, 114.07; 123/406.16, 406.17, 406.19, 406.21, 123/406.29, 406.34, 406.37, 406.38, 123/406.39, 406.4, 406.42, 406.43; 702/179, 181, 56
See application file for complete search history.

(56) References Cited

U.S. PATENT DOCUMENTS 4,282,841 A * 8/1981 Takagi et al. ............ 123/406.21
4,366,701 A * 1/1983 Bittner .......................... 73/35.02
(Continued)

FOREIGN PATENT DOCUMENTS

JP      56-115861 A      9/1981
JP      04-140454 A      5/1992
(Continued)

OTHER PUBLICATIONS

Kobayashi Noriyuki, JP2006022648A machine translation, Jan. 2006.*
(Continued)

*Primary Examiner* — Lindsay Low
*Assistant Examiner* — John Bailey
(74) *Attorney, Agent, or Firm* — Sughrue Mion, PLLC; Richard C. Turner

(57) ABSTRACT

An internal combustion engine knock controlling apparatus is obtained that improves knock detection performance by making a correction period appropriate without performing matching, when calculating a transition correction factor for correcting a filter coefficient used for calculating a mean value and a standard deviation of a knock signal in a transitional operation state. A previous value of a filter coefficient for calculating a knock determination threshold value that has been corrected by a transition correction factor is used for a filter coefficient for calculating the transition correction factor so that the response characteristics are made equal between a filtering process used for calculating a transition correction factor for correcting a knock determination threshold value and a filtering process used for calculating the knock determination threshold value in a transition operation period.

10 Claims, 6 Drawing Sheets

(51) Int. Cl.
*F02D 35/02* (2006.01)
*G01L 23/22* (2006.01)
*F02D 41/14* (2006.01)
*F02D 41/28* (2006.01)

(56) References Cited

U.S. PATENT DOCUMENTS

| | | | | |
|---|---|---|---|---|
| 4,489,692 A | * | 12/1984 | Haraguchi et al. | 123/406.36 |
| 4,711,212 A | * | 12/1987 | Haraguchi et al. | 123/406.38 |
| 4,993,387 A | * | 2/1991 | Sakakibara et al. | 123/406.33 |
| 5,101,790 A | * | 4/1992 | Takasu et al. | 123/406.38 |
| 5,134,980 A | * | 8/1992 | Sakakibara et al. | 123/406.38 |
| 5,153,834 A | * | 10/1992 | Abo et al. | 701/111 |
| 5,188,080 A | * | 2/1993 | Sakakibara et al. | 123/406.38 |
| 5,287,837 A | * | 2/1994 | Hashimoto et al. | 123/406.29 |
| 5,339,245 A | * | 8/1994 | Hirata et al. | 701/111 |
| 5,392,642 A | * | 2/1995 | Tao | 73/114.13 |
| 5,483,936 A | * | 1/1996 | Kerstein et al. | 123/406.16 |
| 5,503,126 A | * | 4/1996 | Sakakibara et al. | 123/406.55 |
| 5,542,291 A | * | 8/1996 | James | 73/114.05 |
| 5,632,247 A | * | 5/1997 | Hashizume et al. | 123/406.26 |
| 5,905,193 A | * | 5/1999 | Hashizume et al. | 73/35.09 |
| 6,446,601 B1 | * | 9/2002 | Franke et al. | 123/406.33 |
| 6,728,658 B1 | * | 4/2004 | Bechhoefer | 702/181 |
| 7,212,912 B2 | * | 5/2007 | Okubo et al. | 701/114 |
| 7,275,519 B2 | * | 10/2007 | Miyazaki et al. | 123/431 |
| 7,302,932 B2 | * | 12/2007 | Shelby et al. | 123/406.26 |
| 7,310,575 B2 | * | 12/2007 | Honda | 701/111 |
| 7,363,142 B2 | * | 4/2008 | Kaneko et al. | 701/111 |
| 7,530,347 B2 | * | 5/2009 | Asano et al. | 123/434 |
| 7,559,234 B1 | * | 7/2009 | Chorpening et al. | 73/112.01 |
| 7,653,477 B2 | * | 1/2010 | Yoshihara et al. | 701/111 |
| 2008/0229806 A1 | * | 9/2008 | Cubr et al. | 73/35.03 |
| 2009/0276147 A1 | * | 11/2009 | Hamama et al. | 701/111 |
| 2010/0174472 A1 | * | 7/2010 | Matsushima et al. | 701/111 |
| 2011/0083640 A1 | * | 4/2011 | Garagnani et al. | 123/406.29 |
| 2011/0139120 A1 | * | 6/2011 | Rollinger et al. | 123/436 |
| 2011/0144893 A1 | * | 6/2011 | Rollinger et al. | 701/111 |
| 2011/0202260 A1 | * | 8/2011 | Cunningham et al. | 701/104 |
| 2011/0259298 A1 | * | 10/2011 | Imamura et al. | 123/436 |
| 2012/0035835 A1 | * | 2/2012 | Glugla et al. | 701/111 |
| 2012/0048234 A1 | * | 3/2012 | Hamama et al. | 123/436 |

FOREIGN PATENT DOCUMENTS

| | | | |
|---|---|---|---|
| JP | 2006-022648 A | | 1/2006 |
| JP | 2006022648 A | * | 1/2006 |

OTHER PUBLICATIONS

Communication dated Jun. 1, 2015 from the State Intellectual Property Office of People's Republic of China in counterpart Application No. 201310004417.0.

\* cited by examiner

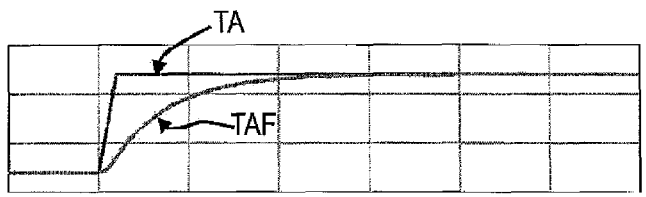
FIG.6A
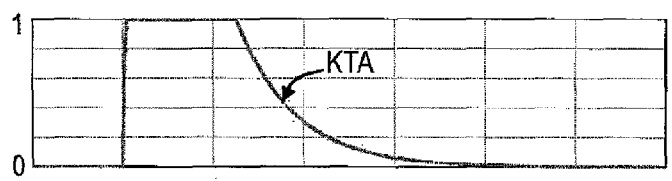
FIG.6B
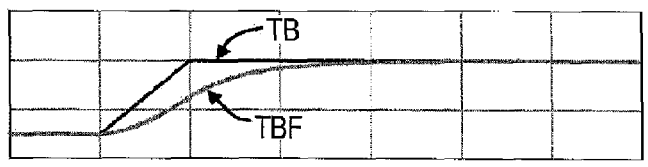
FIG.6C
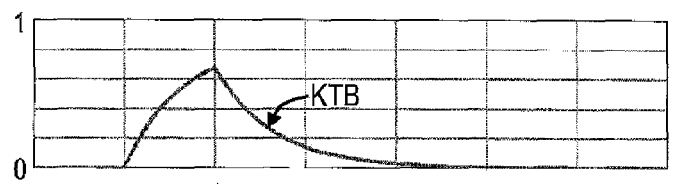
FIG.6D
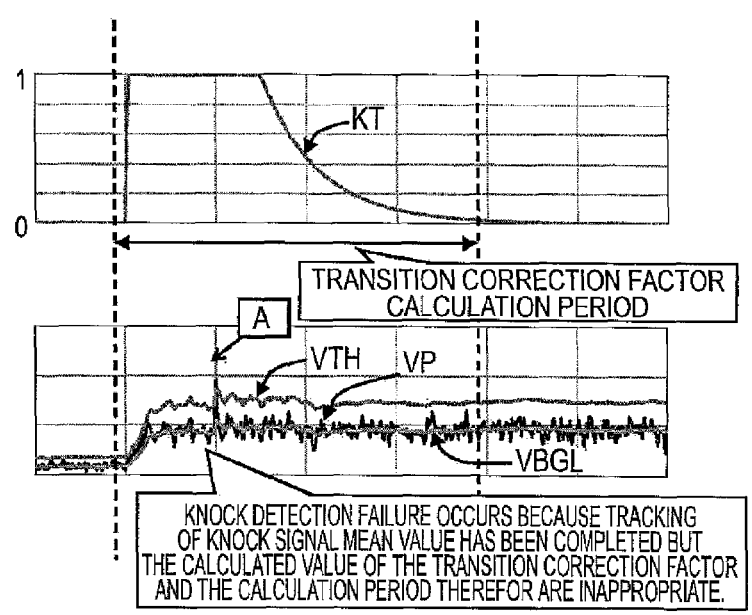
FIG.6E
FIG.6F

INTERNAL COMBUSTION ENGINE KNOCK CONTROLLING APPARATUS

CROSS-REFERENCE TO RELATED APPLICATION

This application is related to copending application Ser. No. 13/290437, filed Jul. 11, 2011, commonly assigned with the present invention.

BACKGROUND OF THE INVENTION

1. Field of the Invention

This invention relates to an internal combustion engine knock controlling apparatus for controlling a knock phenomenon that occurs in an internal combustion engine.

2. Description of the Related Art

Conventionally, a method of detecting a knock phenomenon that occurs in an internal combustion engine by a sensor fitted directly to a block of the internal combustion engine, i.e., a vibration sensor (hereinafter referred to as a "knock sensor") has been known, as disclosed in, for example, JP-A-2006-22648 (Patent Document 1). It is known that when knock occurs during the operation of the internal combustion engine, vibration in a specific frequency band occurs according to the bore diameter of the internal combustion engine or the vibration mode of knock. By measuring the vibration intensity in the specific frequency (hereinafter referred to as a "knock signal"), knock detection is performed.

A knock controlling apparatus that suppresses knock by correcting ignition timing toward the retard side when knock is detected and minimizes torque reduction by reverting ignition timing to an advance side when knock is not detected is also known, as disclosed in, for example, JP-A-56-115861 (Patent Document 2). It is known that an internal combustion engine has the following characteristic. When ignition timing is advanced, the output torque of the internal combustion engine improves but knock occurs more easily. On the other hand, when ignition timing is retarded, the output torque of the internal combustion engine decreases but knock does not easily occur. The above-mentioned knock controlling apparatus is such that, when knock is detected, ignition timing is corrected to the retard side, while when knock is not detected, ignition timing is reverted to the advance side, whereby the internal combustion engine is controlled to operate at the knock limit ignition timing at which the maximum torque is generated while the occurrence of knock is suppressed. However, when, for example, the internal combustion engine is operated with a low load, there are cases in which knock does not occur even if the ignition timing is advanced to the timing at which the torque becomes maximum. In such an operation region, the above-described knock controlling is unnecessary.

In these kinds of knock controlling apparatuses, the knock determination threshold value for determining knock is generally set based on standard statistics such as the mean value and the standard deviation of the knock signal calculated by filtering a knock signal. For example, various methods of setting the knock determination threshold value are known, as disclosed in JP-A-4-140454 (Patent Document 3). In one method, the threshold value is set using the mean value of knock signals calculated by filtering the knock signal, and the gain and offset that have been matched in advance. In another method, the threshold value is set using the mean value of the knock signal and the standard deviation of knock signal calculated by filtering the mean value of knock signal and the deviation of knock signal.

In these methods, when the internal combustion engine is in a steady operating state, in which the revolution speed of the internal combustion engine and the output of the internal combustion engine is almost constant, variations in the mean value and standard deviation of the knock signal are lowered to suppress variations in knock determination threshold value, by setting the filter coefficient of the filtering process to be large, that is, by setting the cut-off frequency to be low. Thereby, a stable operating condition in which torque fluctuation is small can be obtained.

In addition, when the internal combustion engine is in a transitional operation state, in which the revolution speed of the internal combustion engine or the output of the internal combustion engine is increasing or decreasing, the response characteristics of the standard statistics of the knock signal such as the mean value and standard deviation of the knock signal is raised to control the knock determination threshold value to have good tracking capability by setting the filter coefficient of the filtering process to be small, that is, by setting a high cut-off frequency. Thereby, erroneous detection of knock can be suppressed.

U.S. patent application Ser. No. 13/290437, filed by the present applicant et al., has proposed a method of switching over the filter coefficients used in the filtering process for calculating the mean value and standard deviation of the knock signals between in a steady operating state and in a transitional operation state. The purposes thereof are to detect the transitional operation state without delay and to match the transition correction amount, including the degree of accelerating/decelerating, the transition correction duration, and the transition correction amount decrease speed, with a smaller number of steps. A filtering process is carried out for each of plural operating state values, and a transition correction factor is calculated based on a value obtained by normalizing a deviation between the operating state value and the filtered operating state value by a representative value. The filter coefficient used for the filtering process for calculating the mean value and the standard deviation of knock signal is corrected using the obtained transition correction factor, so that the knock determination threshold value in the transitional operation state can be appropriately set to suppress erroneous detection of knock.

[Patent Document 1] JP-A-2006-22648
[Patent Document 2] JP-A-56-115861
[Patent Document 3] JP-A-4-140454

However, the method proposed in U.S. patent application Ser. No. 13/290437 uses a predetermined value that has been matched in advance, as the filter coefficient used for the filtering process corresponding to the operating state value. Consequently, since the filter coefficient used in the filtering process for calculating the mean value and standard deviation of the knock signal is corrected by the transition correction factor, the response characteristics of the mean value and standard deviation of the knock signal are improved. On the other hand, a problem is that the transition correction factor is kept calculated after tracking of the mean value and the standard deviation of the knock signal has been completed, that is, the correction period of the filter coefficient used for the filtering process for calculating the mean value and standard deviation of the knock signal is inappropriate, so knock detection cannot be performed appropriately.

Another problem is as follows. When the calculation process period for the transition correction factor is different from the calculation process period for the mean value and standard deviation of the knock signal, the response characteristics of the filtering process for calculating the transition correction factor and the response characteristics of the filtering process for calculating the mean value and standard deviation of the knock signal become different from each other. Consequently, the correction period becomes inappropriate, and knock detection cannot be performed appropriately.

The just-mentioned problem will be explained with reference to FIG. 6. FIG. 6A shows the first operating state value and the filtered value thereof in a transitional operation state. FIG. 6B shows the first post-normalization operating state value deviation calculated based on the first operating state value. FIG. 6C shows the second operating state value and the filter value thereof. FIG. 6D shows the second post-normalization operating state value deviation calculated based on the second operating state value. FIG. 6E shows the transition correction factor calculated by summing the first post-normalization operating state value deviation and the second post-normalization operating state value deviation. FIG. 6F shows an operation example of the knock signal in a transitional operation state, the mean value of the knock signal in a state in which its response characteristics are raised by a transition correction factor, and the knock determination threshold value that is set according to the mean value of the knock signal, and as seen at point A in FIG. 6F, it shows the state in which knock has occurred immediately after the transitional operation state.

According to the method proposed in U.S. patent application Ser. No. 13/290437, the filter coefficients used in the filtering process for calculating the operating state values are predetermined values. Therefore, even after tracking of the mean value of the knock signal has been completed by raising the response characteristics by a transition correction factor, the transition correction factor is kept calculated. Consequently, the response characteristics of the mean value of the knock signal remains quick, so the knock determination threshold value is not stabilized. Therefore, knock detection cannot be performed appropriately, or knock detection failure occurs.

SUMMARY OF THE INVENTION

Accordingly, in order to solve the foregoing problems, it is an object of the invention to provide an internal combustion engine knock controlling apparatus that can improve the knock detection performance by adjusting a correction period without performing matching, when calculating a transition correction factor for correcting a filter coefficient used for calculating the mean value and standard deviation of the knock signal in a transitional operation state.

An internal combustion engine knock controlling apparatus according to this invention includes: a sensor outputting a signal based on vibration of an internal combustion engine; knock signal calculating means for calculating, from the output from the sensor, a characteristic component of knock occurring in the internal combustion engine as a knock signal at every ignition timing; knock signal standard statistic calculating means for calculating a standard statistic of the knock signal by filtering processing the knock signal calculated by the knock signal calculating means; knock determination threshold calculating means for calculating a knock determination threshold value for determining knock based on the standard statistic of the knock signal calculated by the knock signal standard statistic calculating means; knock determination means for determining that knock has occurred if the knock signal calculated by the knock signal standard statistic calculating means exceeds the knock determination threshold value calculated by the knock determination threshold calculating means; operating state value detecting means for detecting plural operating state values each indicating an operating condition of the internal combustion engine; operating state value deviation normalization means for normalizing deviations between the operating state values detected by the operating state value detecting means and values obtained by filtering processing the operating state values, using a representative value of the operating state values; transition correction factor calculating means for calculating a transition correction factor based on plural post-normalization operating state value deviations calculated by the operating state value deviation normalization means; filter coefficient correcting means for correcting a filter coefficient used in a filtering process of the knock signal standard statistic calculating means based on the transition correction factor calculated by the transition correction factor calculating means; and filter characteristic adjusting means for adjusting a response characteristic of the filtering process in the operating state value deviation normalization means to be equal to a response characteristic of the filtering process in the knock signal standard statistic calculating means.

The internal combustion engine knock controlling apparatus according to this invention can prevent erroneous detection of knock resulting from tracking delay of the mean value and standard deviation of knock signal in a transitional operation state without performing comprehensive matching for calculating a correction factor in the transitional operation state, and can adjust the correction period and the correction amount for improving the response characteristics of the mean value and standard deviation of the knock signal, so that it can improve knock detection performance.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows graphs illustrating operations of a transition correction factor, a knock signal mean value corrected by the transition correction factor, and a knock determination threshold value in a conventional internal combustion engine knock controlling apparatus.

DETAILED DESCRIPTION OF THE INVENTION

First Preferred Embodiment

Figure 1:
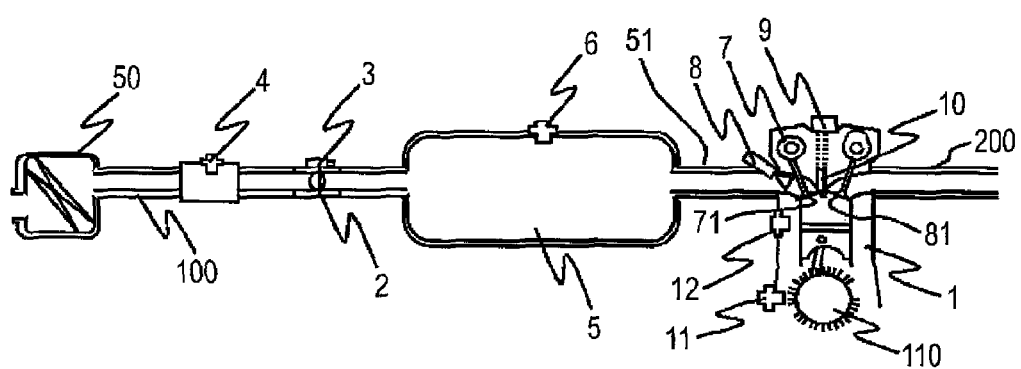
FIG. 1 is a configuration view schematically showing an internal combustion engine to which an internal combustion engine knock controlling apparatus according to a first preferred embodiment of this invention is applied.

Hereinbelow, an internal combustion engine knock controlling apparatus according to a first preferred embodiment of this invention will be described in detail with reference to the drawings. FIG. 1 is a configuration view schematically showing an internal combustion engine to which the internal combustion engine knock controlling apparatus according to the first preferred embodiment is applied. It should be noted that, although the internal combustion engine for vehicles such as automobiles generally has plural cylinders and pistons, only one cylinder and one piston are depicted in FIG. 1 for simplicity in illustration.

Referring to FIG. 1, an air filter 50 is provided on the upstream side of an intake system 100 of an internal combustion engine 1 (hereinafter referred to as an "engine"), and a surge tank 5 for reserving the air sucked through the air filter 50 is provided at the downstream side thereof. The surge tank 5 is coupled to plural cylinders of the engine 1 via an intake manifold 51.

An electronically controlled throttle valve (hereinafter referred to as a "throttle valve") 2 is provided on the upstream side of the surge tank 5. The degree of opening of the throttle valve 2 is controlled electronically so as to adjust the intake air flow rate of the intake system 100. An air flow sensor 4 is provided on the upstream side of the throttle valve 2. The air flow sensor 4 measures the intake air flow rate in the intake system 100 and outputs an intake air amount signal corresponding to the measured value.

A throttle opening sensor 3 measures the degree of opening of the throttle valve 2 and outputs a throttle valve opening signal corresponding to the measured value. In place of the electronic throttle valve 2, it is also possible to use a mechanical throttle valve directly connected to an acceleration pedal, not shown in the drawings, by a wire.

An intake manifold pressure sensor 6 provided to the surge tank 5 measures the intake air pressure in the surge tank 5, i.e., the intake air pressure in the intake manifold 51, and outputs an intake manifold pressure signal corresponding to the measured value. Although both the air flow sensor 4 and the intake manifold pressure sensor 6 are provided in the first preferred embodiment, only one of them may be provided.

An air-intake valve 71 provided to an air-intake port downstream of the surge tank 5. The open/close timing of the air-intake valve 71 is variably controlled by a variable intake valve mechanism 7. An injector 8 for injecting fuel is provided to the air-intake port. The injector 8 may be provided so as to directly inject fuel into a cylinder of the engine 1.

An ignition coil 9 for igniting an air-fuel mixture in the cylinder and a spark plug 10 integrally formed with the ignition coil 9 are provided to a cylinder head of the engine 1. In addition, a plate 110 having plural edges installed on its peripheral surface at predetermined intervals is provided to the crankshaft of the engine 1. A crank angle sensor 11 is provided opposing the edges of the plate 110. The crank angle sensor 11 detects the edges of the plate 110 that rotates along with the crankshaft, and outputs a pulse signal in synchronization with the installation intervals of the respective edges. A knock sensor 12 provided to the engine 1 outputs a vibration waveform signal based on vibration of the engine 1.

An exhaust valve 81 provided to an exhaust port of the cylinder discharges exhaust gas from the interior of the cylinder to an exhaust system 200 by opening the valve. A catalyst system (not shown) for cleaning the exhaust gas is provided on the downstream side of the exhaust system 200.

Figure 2:
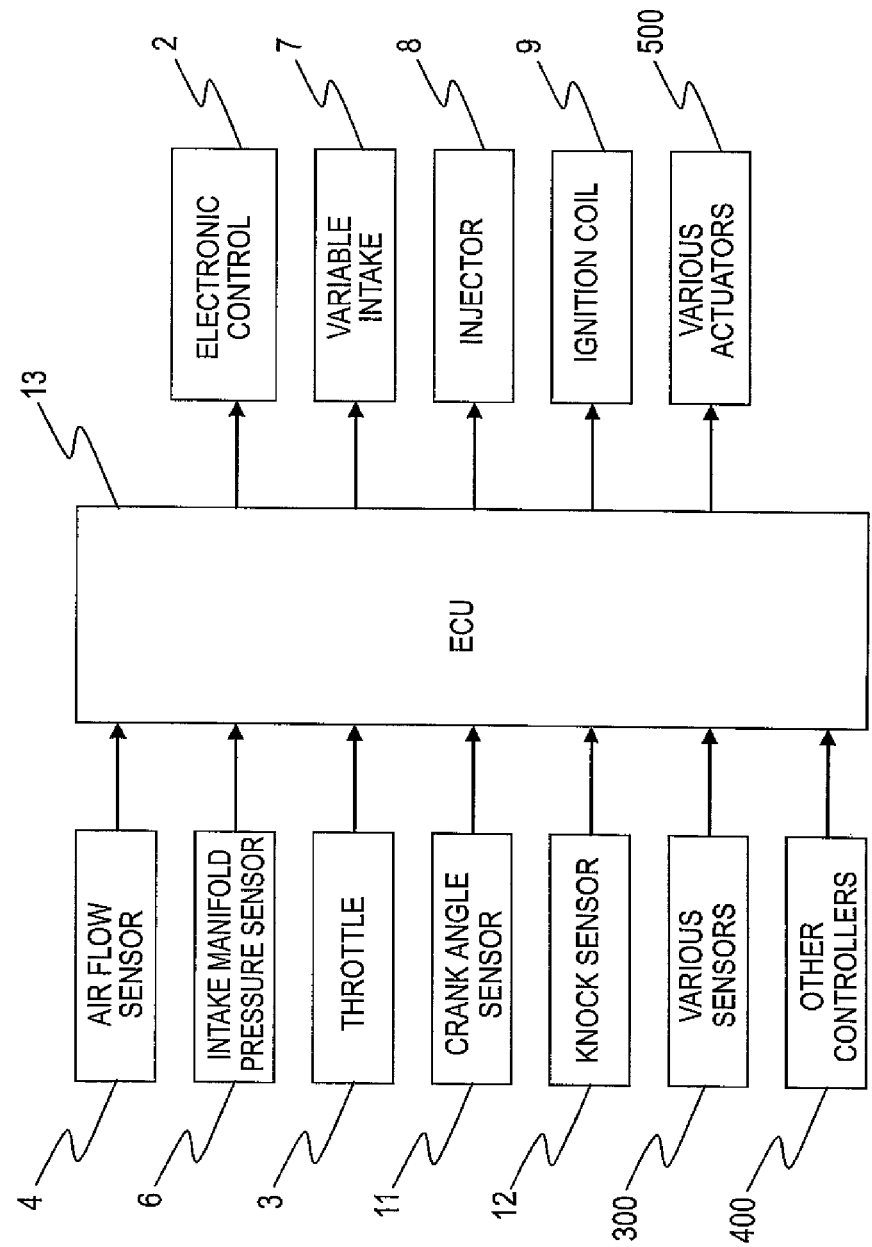
FIG. 2 is a block diagram showing the configuration of a control device of the internal combustion engine to which the internal combustion engine knock controlling apparatus according to the first preferred embodiment of this invention is applied.

FIG. 2 is a block diagram showing the configuration of a control device of the internal combustion engine to which the internal combustion engine knock controlling apparatus according to the first preferred embodiment is applied. Referring to FIG. 2, an electronic control unit 13 (hereinafter referred to as "ECU") of the engine 1 is composed of an arithmetic device such as a microcomputer. The ECU 13 receives an intake air flow rate signal that is output from the air flow sensor 4, an intake manifold pressure signal that is output from the intake manifold pressure sensor 6, a throttle valve opening signal that is output from the throttle opening sensor 3, a pulse signal that is in synchronization with the installation intervals of the edges of the plate 110 and is output from the crank angle sensor 11, and a vibration waveform signal of the engine 1 that is output from the knock sensor 12.

Other than the just-mentioned signals, the ECU 13 receives respective signals corresponding to respective measured values from various other sensors 300, and it also receives signals from other controllers 400, such as an automatic transmission control system, a brake control system, and a traction control system.

The ECU 13 calculates a target throttle opening based on, for example, the accelerator opening and the operating conditions of the engine 1, and it controls the degree of opening of the throttle valve 2 based on the calculated target throttle opening. In addition, the ECU 13 controls the variable intake valve mechanism 7 to variably control the opening timing of the air-intake valve 71 according to the operating conditions of the engine 1. Also, the ECU 13 drives the injector 8 to achieve a target air-fuel ratio to control the fuel injection amount. The ECU 13 further controls the electric current passed to the ignition coil 9 so as to achieve a target ignition timing to control ignition timing.

In addition, the ECU 13 performs controlling for suppressing the occurrence of knock by setting the target ignition timing to the retard side when it detects knock of the engine 1, as will be described later. Furthermore, the ECU 13 calculates instruction values for controlling various actuators 500 other than the foregoing, and it controls the various actuators 500 based on the instruction values.

Figure 3:
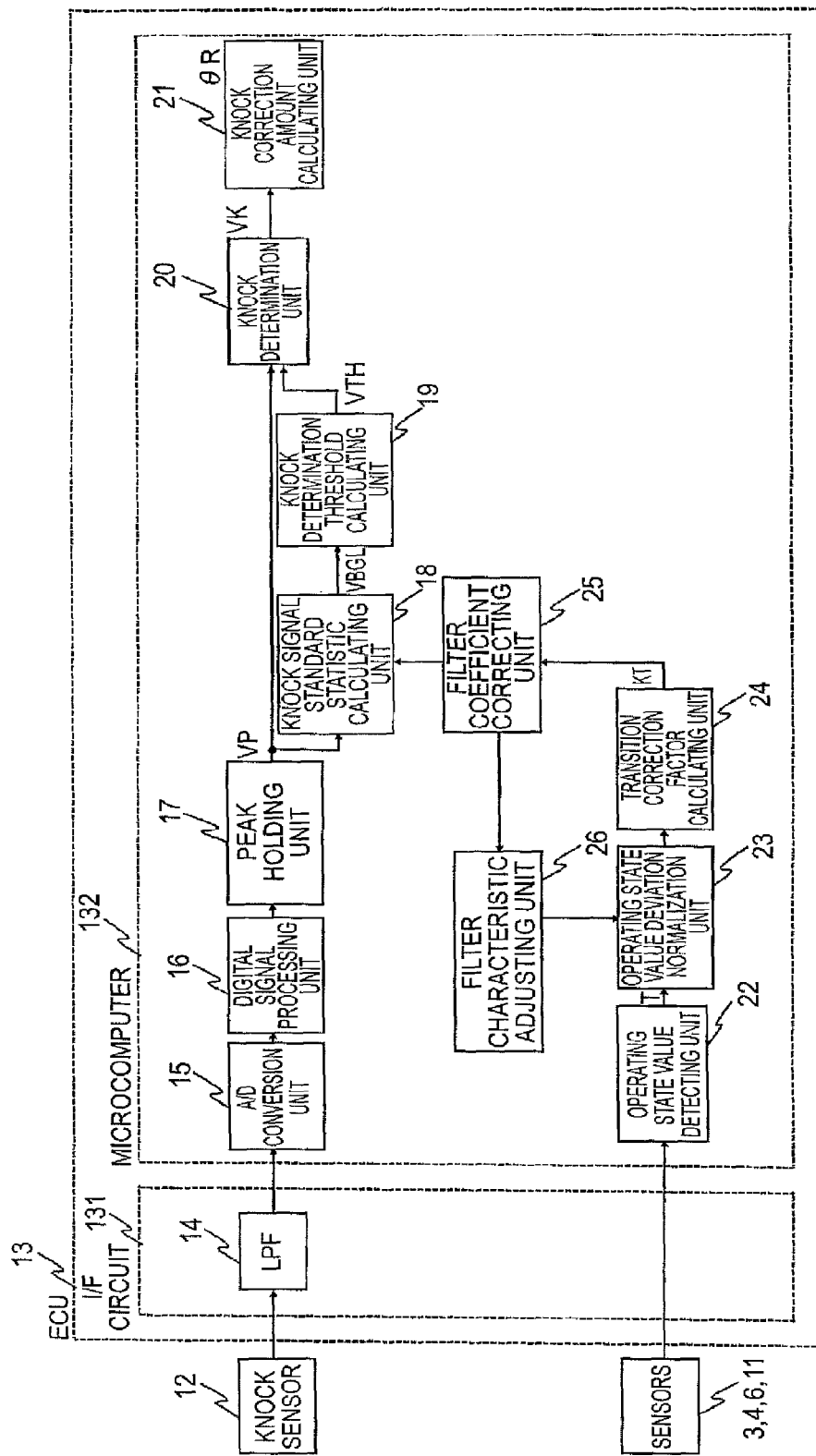
FIG. 3 is a block diagram showing the configuration of the internal combustion engine knock controlling apparatus according to the first preferred embodiment of this invention.

Next, the knock controlling performed in the ECU 13 will be described. FIG. 3 is a block diagram showing the configuration of the engine knock controlling apparatus according to the first preferred embodiment. Referring to FIG. 3, the ECU 13 has various interface circuits 131 and a microcomputer 132. The various interface circuits 131 include a low-pass filter (hereinafter referred to as "LPF"), which is an interface circuit for knock controlling, for removing a high-frequency component of the signal output from the knock sensor 12.

The microcomputer 132 as a whole includes an A-D converter for converting analog signal to digital signal, a ROM region for storing control programs and control parameters, a RAM region for storing variables in executing programs and the like, but FIG. 3 mainly shows its configuration that is related to the knock controlling apparatus.

The microcomputer 132 has an A-D conversion unit 15 as an A-D conversion means, a digital signal processing unit 16 as a digital signal processing means, a peak holding unit 17 as a peak holding means, a knock signal standard statistic calculating unit 18 as a knock signal standard statistic calculating means, a knock determination threshold calculating unit 19 as a knock determination threshold calculating means, a knock determination unit 20 as a knock determination means, and a knock correction amount calculating unit 21 as a knock correction amount calculating means. The microcomputer 132 also has an operating state value detecting unit 22 as an operating state value detecting means, to which the output signals from the throttle opening sensor 3, the air flow sensor 4, the intake manifold pressure sensor 6, and the crank angle sensor 11 are input via the interface circuits 131, an operating state value deviation normalization unit 23 as an operating state value deviation normalization means, a transition correction factor calculating unit 24 as a transition correction factor calculating means, a filter coefficient correcting unit 25 as a filter coefficient correcting means, and a filter characteristic adjusting unit 26 as a filter characteristic adjusting means.

The A-D conversion unit 15 of the microcomputer 132 performs A-D conversion of a vibration waveform signal that is input thereto from the knock sensor 12 via an LPF 14 at every certain time gap, for example, every 10 [μs] or 20 [μs]. The LPF 14 also includes the function of setting the center of the vibration component to 2.5 [V] by, for example, applying a bias of 2.5 so that the A-D conversion unit 15 can take in the entire vibrational component. The LPF 14 also includes the gain conversion function such as to amplify the vibration component with its center being at 2.5 [V] when the vibration component is small, and to reduce the vibration component with its center being at 2.5 [V] when the vibration component is large so that the vibration component can fall within the range of 0 [V] to 5 [V] centered at 2.5 [V].

It is possible that the A-D conversion unit 15 may be configured to perform A-D conversion of the analog signal from the LPF 14 at all times, and to send only the data during the period in which knock occurs in the engine 1, for example, in the knock detection period that is set to be from the top dead center (hereinafter referred to as "TDC") of the piston to 50° CA after top dead center (hereinafter referred to as "ATDC"), to the digital signal processing unit 16 and beyond. Alternatively, for example, the A-D conversion unit 15 may be configured to perform A-D conversion only in a knock detection period that is set to be from the TDC to 50° CA ATDC, and to send the data to the digital signal processing unit 16 and beyond.

In the digital signal processing unit 16, time-frequency analysis with digital signal processing is executed for the knock sensor signal that has passed through the A-D window of the A-D conversion unit 15. As this digital signal processing, a process called, for example, discrete Fourier transform (DFT) or short-time Fourier transform (STFT) is used to calculate the spectrum column of the knock-specific frequency component for each predetermined duration. As the digital signal processing, an IIR (infinite impulse response) filter and an FIR (finite impulse response) filter may be used to extract the knock-specific frequency component. In addition, the computation in the digital signal processing unit 16 may be processed while executing the A-D conversion, or may be executed collectively by an interrupt process in synchronization with rotation of the engine.

The peak holding unit 17 calculates the peak value of the spectrum column calculated by the digital signal processing unit 16, as a knock signal VP. Thus, the peak holding unit 17 functions as a knock signal calculating means. The process at the peak holding unit 17 and beyond is executed in an interrupt process in synchronization with rotation of the engine.

The knock signal standard statistic calculating unit 18 executes a filtering process to the knock signal VP calculated for each stroke of the engine by the peak holding unit 17, and calculates a filter value VBGL, using the following equation (1). This filter value VBGL corresponds to BGL, which is the mean value of the vibration level of the knock signal VP.

$$VBGL(n)=KBGL(n)\times VBGL(n-1)+(1-KBGL(n))\times VP(n) \quad (1)$$

VBGL(n): mean value of knock signal VP, VP(n): knock signal after normalization, KBGL(n): filter coefficient Subsequently, a knock determination threshold value VTH is calculated in the knock determination threshold calculating unit 19 using the following equation (2).

$$VTH(n)=KTH\times VBGL(n)+VOFS(n) \quad (2)$$

VTH(n): knock determination threshold value, KTH: knock determination threshold value calculation coefficient, VOFS: offset Here, (n) means the process at the current ignition timing, and (n−1) means the process at the previous ignition timing. The filter coefficient KBGL(n) for calculating BGL used in the knock signal standard statistic calculating unit 18 is corrected by a transition correction factor KT(n). The method of calculating the transition correction factor KT(n) and the method of correcting the filter coefficient KBGL(n) for calculating BGL using the transition correction factor KT(n) will be described later.

Next, the knock determination unit 20 judges whether or not knock has occurred using the following equation (3) and outputs a signal according to the knock intensity.

$$VK(n)=(VP(n)-VTH(n))/VTH(n) \quad (3)$$

VK(n): knock intensity (It is determined that knock has occurred when VK(n)>0.)

The signal according to the knock intensity, which is output from the knock determination unit 20, is input to the knock correction amount calculating unit 21, and the knock correction amount calculating unit 21 calculates a retard amount for each one ignition according to the knock intensity using the following equation (4).

$$\Delta\theta R(n)=\max(-VK(n)\times Kg(n), \theta min) \quad (4)$$

ΔθR(n): retard amount for one ignition, Kg(n): retard amount reflection coefficient, θmin: maximum retard amount Further, the retard amount for each one ignition is added up to compute the ignition timing knock correction amount, but when knock does not occur, the ignition timing is recovered to be advanced. This is computed according to the following equation (5).

$$\theta R(n)=\min(\theta R(n-1)+\Delta\theta R(n)+Ka, \theta ma) \quad (5)$$

θR knock correction amount, Ka(n): advance recovery factor, θmax: maximum advance amount Using the knock correction amount θR computed in this way, the final ignition timing is calculated using the following equation (6).

$$\theta IG=\theta B+\theta R(n) \quad (6)$$

θIG: final ignition timing, ∂4B: standard ignition timing

Thus, the foregoing has described the processing method of achieving knock detection using the frequency analysis result using digital signal processing from the digital signal processing unit 16 to the knock correction amount calculating unit 21 and knock controlling that suppresses knock by retarding the ignition timing.

Next, the following describes a method of calculating the filter coefficient KBGL(n) for calculating BGL, which is the mean value of the vibration level used in the above-described knock signal standard statistic calculating unit 18, and a method of calculating the transition correction factor KT(n) for correcting the filter coefficient KBGL(n) for calculating BGL.

Referring to FIG. 3, the operating state value detecting unit 22 detects plural operating state values based on the signals from plural sensors, for example, from the throttle opening sensor 3, the air flow sensor 4, the intake manifold pressure sensor 6, and the crank angle sensor 11 as shown in FIG. 2. The subsequent operating state value deviation normalization unit 23 calculates the deviation between the operating state value detected by the operating state value detecting unit 22 and the value obtained by subjecting the operating state value to the filtering process, and normalizes the calculated operating state value deviation by dividing it by the representative value of the respective operating state values. Here, the previous value of the filter coefficient KBGL(n) for calculating BGL calculated by the filter coefficient correcting unit 25 is used for the filter coefficient used in the filtering process of the operating state value deviation normalization unit 23 by the filter characteristic adjusting unit 26.

The subsequent transition correction factor calculating unit 24 calculates the transition correction factor KT(n) based on plural normalized operating state value deviations. The subsequent filter coefficient correcting unit 25 calculates the above-described filter coefficient KBGL(n) for calculating BGL using the calculated transition correction factor KT(n).

Hereinbelow, the method of calculating the transition correction factor KT(n) and the method of correcting the filter coefficient KBGL(n) for calculating BGL using the transition correction factor KT(n) will be described in more detail with reference to FIGS. 4 and FIG. 5.

Figure 4:
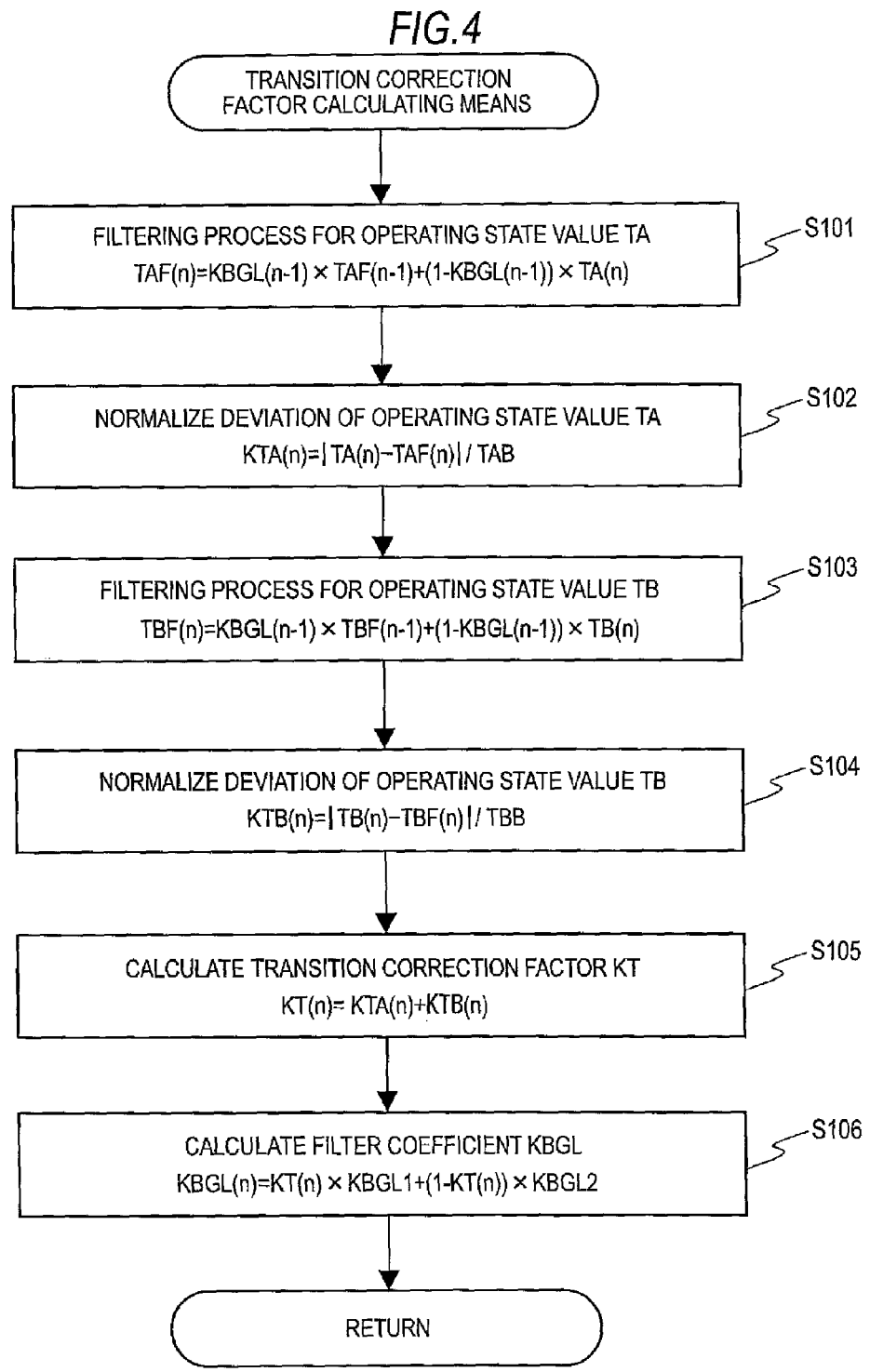
FIG. 4 is a flow chart showing a method of calculating a transition correction factor, and a method of correcting a filter coefficient for calculating a background level, which is the mean value of a knock signal vibration level by the transition correction factor, in the internal combustion engine knock controlling apparatus according to the first preferred embodiment of this invention.
Figure 5A:
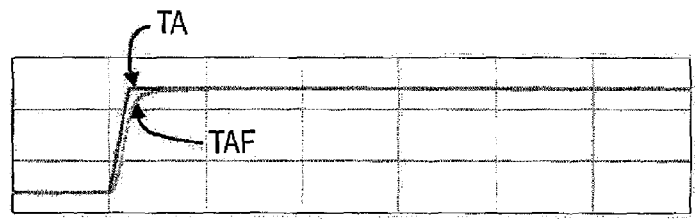
FIG. 5 shows graphs illustrating operations of a transition correction factor, a knock signal mean value corrected by the transition correction factor, and a knock determination threshold value in the internal combustion engine knock controlling apparatus according to the first preferred embodiment of this invention.
Figure 5B:
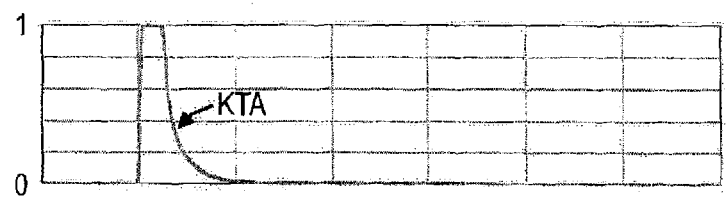
Figure 5C:
Figure 5D:
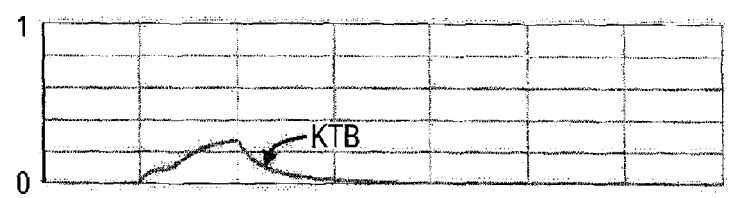
Figure 5E:
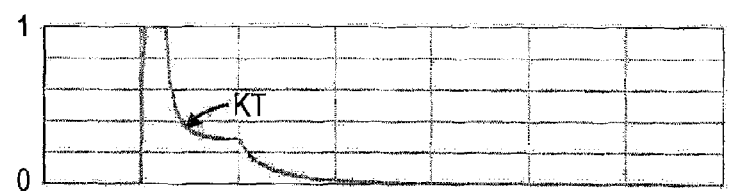
Figure 5F:
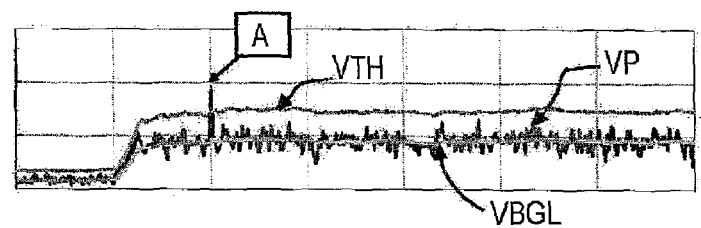

FIG. 4 is a flow chart showing a method of calculating the transition correction factor in the internal combustion engine knock controlling apparatus according to the first preferred embodiment. The flow chart shown in FIG. 4 illustrates the calculation of the transition correction factor by the transition correction factor calculating unit 24 as well as the filter coefficient correcting unit 25 and the filter characteristic adjusting unit 26 shown in FIG. 3 more specifically, and it shows an example in the case where different operating state values TA and TB are used by the operating state value detecting unit 22. The process shown in FIG. 4 is processed with the same period as that for the calculation of the knock signal standard statistic.

Referring to FIG. 4, in step S101, a filtering process is performed for the first operating state value TA(n) to calculate a filtered operating state value TAF(n). Here, the filter coefficient KBGL(n−1) used in the filtering process is the previous value of the filter coefficient KBGL(n) used in the filtering process for averaging the knock signal VP, which is calculated in later-described step S106.

In subsequent step S102, the deviation of the first operating state value TA(n) before and after the filtering is calculated, and further, normalization is carried out by dividing it by a normalization reference value TAB of the first operating state value TA(n), to calculate a post-normalization operating state value KTA(n).

In subsequent step S103, a filtering process is performed for the second operating state value TB(n) to calculate a filtered operating state value TBF(n). Here, the filter coefficient KBGL(n−1) used in the filtering process is the previous value of the filter coefficient KBGL(n) used in the filtering process for averaging the knock signal VP, which is calculated in later-described step S106.

In subsequent step S104, the deviation of the second operating state value TA(n) before and after the filtering is calculated, and further, normalization is carried out by dividing it by a normalization reference value TBB of the second operating state value TB(n), to calculate a post-normalization operating state value KTB(n).

In subsequent step S105, the transition correction factor KT(n) is calculated. As shown in FIG. 4, when calculating the transition correction factor KT(n) from the different operating state values TA(n) and TB(n), the total sum of the post-normalization operating state value deviations is calculated. Although not shown in the drawings, when calculating the transition correction factor using both the target value and the actually measured value for the same operating state value in order to suppress the correction delay in the transitional operation state, that is, when the second operating state value TB(n) is the target value TAt(n) of the first operating state value TA(n) in FIG. 4, the maximum value of the post-normalization operating state value deviation is calculated so that multiple correction will not be made needlessly. It is also possible to use a method in which the transition correction factor KT(n) is clipped at a predetermined value (for example, at 1.0). It is also possible to provide a dead band by setting the transition correction factor KT(n) to zero when it is equal to or less than a predetermined value (for example, 0.05).

Using the transition correction factor KT (n) calculated in the above-described manner, the filter coefficient KBGL(n) used in the foregoing equation (1) is calculated in step S106. Here, the filter coefficient KBGL1 is the filter coefficient matched in the transitional operation state, in which the response characteristics are required most, and KBGL2 is the filter coefficient matched in the steady operating state.

FIG. 5 illustrates an example of the operations of the knock signal VP, the knock signal mean value VBGL, and the knock determination threshold value VTH in the transitional operation state, using the transition correction factor KT(n) calculated according to the processing described above.

FIG. 5 is an operation example showing a case in which the first preferred embodiment of this invention is applied to the same transitional operation state as previously described referring to FIG. 6. According to the first preferred embodiment of this invention, the filter value of the operating state value is calculated using the previous value of the filter coefficient for calculating BGL corrected by the transition correction factor. As a result, the calculation period for the filter value of the operating state value and the post-normalization operating state value deviation becomes shorter than that in the method using the conventional apparatus shown in FIG. 6, and the correction period becomes appropriate. Thereby, the occurrence of knock can be detected without continuing the correction for improving the response characteristics of the mean value of the knock signal after the completion of the transitional operation state.

As described above, the internal combustion engine knock controlling apparatus according to the first preferred embodiment of this invention uses the previous value of the filter coefficient used in the filtering process for averaging the knock signal as the filter coefficient used in the filtering process in calculating the transition correction factor, to make equal the process period of the filtering process for calculating the transition correction factor and the process period of the filtering process for averaging the knock signal. Thereby, the internal combustion engine knock controlling apparatus according to the first preferred embodiment makes it possible to calculate the transition correction factor according to the duration of the transitional operation state without performing the matching of the filter coefficients used in calculating the transition correction factor.

In addition, by correcting the filter coefficient used in the filtering process for calculating the standard statistic (the mean value in this embodiment) of the knock signal using the transition correction factor calculated in the foregoing manner, the mean value of the knock signal can be calculated according to the transitional operation state. Therefore, the knock determination threshold value can be set appropriately during the transition operation, and moreover, the knock detection performance after completion of the transition operation can be improved.

An embodiment of the internal combustion engine knock controlling apparatus according to this invention has been described in detail hereinabove. The internal combustion engine knock controlling apparatus according to this invention has the following features.

(1) An internal combustion engine knock controlling apparatus according to this invention is characterized by including: a sensor outputting a signal based on vibration of an internal combustion engine; knock signal calculating means for calculating, from the output from the sensor, a characteristic component of knock occurring in the internal combustion engine as a knock signal at every ignition timing; knock signal standard statistic calculating means for calculating a standard statistic of the knock signal by filtering processing the knock signal calculated by the knock signal calculating means; knock determination threshold calculating means for calculating a knock determination threshold value for determining knock based on the standard statistic of the knock signal calculated by the knock signal standard statistic calculating means; knock determination means for determining that knock has occurred if the knock signal calculated by the knock signal standard statistic calculating means exceeds the knock determination threshold value calculated by the knock determination threshold calculating means; operating state value detecting means for detecting plural operating state values each indicating an operating condition of the internal combustion engine; operating state value deviation normalization means for normalizing deviations between the operating state values detected by the operating state value detecting means and values obtained by filtering processing the operating state values, using a representative value of the operating state values; transition correction factor calculating means for calculating a transition correction factor based on plural post-normalization operating state value deviations calculated by the operating state value deviation normalization means; filter coefficient correcting means for correcting a filter coefficient used in a filtering process of the knock signal standard statistic calculating means based on the transition correction factor calculated by the transition correction factor calculating means; and filter characteristic adjusting means for adjusting a response characteristic of the filtering process in the operating state value deviation normalization means to be equal to a response characteristic of the filtering process in the knock signal standard statistic calculating means.

With this structure, the response characteristics are made equal between the filtering process for calculating the mean value and standard deviation of the knock signal and the filtering process for calculating the correction factor for correcting the filter coefficient used in the filtering process for calculating the mean value and standard deviation of the knock signal. Consequently, in a transitional operation state, the correction period for improving the response characteristic of the mean value and standard deviation of the knock signal and the calculation period for the correction factor can be made equal. As a result, the correction for improving the response characteristics of the mean value and standard deviation of the knock signal is not continued after the transitional operation state has completed, and knock detection performance can be improved.

(2) The internal combustion engine knock controlling apparatus according to this invention is characterized in that the filter characteristic adjusting means uses a previous value of the filter coefficient calculated by the filter coefficient correcting means as the filter coefficient used in the filtering process in the operating state value deviation normalization means.

In this structure, the previous value of the filter coefficient used in the filtering process for calculating the mean value and standard deviation of the knock signal that has been corrected using the correction factor is used as the filter coefficient used in the filtering process for calculating the correction factor. Thereby, the response characteristics of the filtering processes for calculating the correction factor to correct the filter coefficients used in the filtering process for calculating the mean value and standard deviation of the knock signal can be made equal. Thus, without performing matching, the transition correction period can be made appropriate, and knock detection performance can be improved.

(3) Furthermore, the internal combustion engine knock controlling apparatus according to this invention is characterized in that the process of the operating state value deviation normalization means is performed with the same period as the process of the knock signal standard statistic calculating means.

This structure can make equal the response characteristics of the filtering process for calculating the mean value and standard deviation of the knock signal and the response characteristics of the filtering process for calculating the correction factor. As a result, the transition correction period can be made appropriate without performing matching, and the knock detection performance can be improved.

It should be noted that various modifications and alterations of this invention will be apparent to those skilled in the art without departing from the scope and spirit of this invention, and that this invention is not limited to the illustrative embodiments set forth herein.

What is claimed is:

1. An internal combustion engine knock controlling apparatus comprising:
 a sensor configured to output a signal based on vibration of an internal combustion engine;
 a knock signal calculator configured to calculate, from an output of the sensor, a knock signal at every ignition timing;
 a knock signal standard statistic calculator configured to calculate a standard statistic of the knock signal by first filtering processing of the knock signal;
 a knock determination threshold calculator configured to calculate a knock determination threshold value for determining knock based on the standard statistic of the knock signal;
 a knock determiner configured to determine that the knock has occurred if the knock signal exceeds the knock determination threshold value;
 an operating state value detector configured to detect operating state values each indicating an operating condition of the internal combustion engine;
 an operating state value deviation normalizer configured to calculate post-normalization operating state value deviations by normalizing deviations between the detected operating state values and values obtained by second filtering processing of the detected operating state values, using a representative value of the operating state values;

a transition correction factor calculator configured to calculate a transition correction factor based on the post-normalization operating state value deviations;

a filter coefficient corrector configured to correct a filter coefficient used in the first filtering processing performed by the knock signal standard statistic calculator, based on the transition correction factor; and a filter characteristic adjuster configured to adjust a response characteristic of the second filtering processing performed by the operating state value deviation normalizer to be equal to a response characteristic of the first filtering processing performed by the knock signal standard statistic calculator.

2. The internal combustion engine knock controlling apparatus according to claim 1, wherein the filter characteristic adjuster is configured to use a previous value of the filter coefficient calculated by the filter coefficient corrector as the filter coefficient used in the second filtering processing performed by the operating state value deviation normalizer.

3. The internal combustion engine knock controlling apparatus according to claim 1, wherein a process of the operating state value deviation normalizer is performed with a same period as a process of the knock signal standard statistic calculator.

4. The internal combustion engine knock controlling apparatus according to claim 2, wherein a process of the operating state value deviation normalizer is performed with a same period as a process of the knock signal standard statistic calculator.

5. The internal combustion engine knock controlling apparatus according to claim 1, wherein the knock signal calculator is configured to calculate, from the output of the sensor, a characteristic component of knock occurring in the internal combustion engine as the knock signal.

6. The internal combustion engine knock controlling apparatus according to claim 1, wherein the operating state value deviation normalizer is configured to perform the second filtering processing of the detected operating state values with the filter coefficient of a previous cycle.

7. The internal combustion engine knock controlling apparatus according to claim 6, wherein the filter coefficient corrector is configured to calculate the filter coefficient for a current cycle based on the transition correction factor calculated based on the filter coefficient of the previous cycle, which has been used in calculating the post-normalization operating state value deviation.

8. The internal combustion engine knock controlling apparatus according to claim 7, wherein the knock signal standard statistic calculator is configured to perform the first filtering by applying the filter coefficient for the current cycle, to calculate the standard statistic of the knock signal corrected based the transition correction factor.

9. The internal combustion engine knock controlling apparatus according to claim 6, wherein the operating state value deviation normalizer is configured to calculate the post-normalization operating state value deviations by dividing the deviations between the detected operating state values and the filtered operating state values by the representative value.

10. The internal combustion engine knock controlling apparatus according to claim 1, wherein the filter coefficient corrector is configured to calculate the filter coefficient for a current cycle as a weighted sum of a steady operating state filter coefficient and a transitional operating state filter coefficient, by applying the calculated transition correction factor as a weight.

* * * * *